United States Patent [19]

Honma et al.

[11] Patent Number: 4,906,501
[45] Date of Patent: Mar. 6, 1990

[54] LAMINATED DAMPING MATERIAL FOR VEHICLE AND METHOD FOR WELDING THE MATERIAL TO VEHICLE BODY PANEL

[75] Inventors: Hiyoshi Honma; Masami Fukagawa; Hitoshi Haga; Tsuyoshi Yamashita; Mitsuo Nakamura, all of Wako, Japan

[73] Assignee: Honda Giken Kogyo Kabushiki Kaisha, Tokyo, Japan

[21] Appl. No.: 289,300

[22] Filed: Dec. 23, 1988

[30] Foreign Application Priority Data

Dec. 28, 1987 [JP] Japan ................... 62-336592

[51] Int. Cl.$^4$ ............................ B32B 3/26
[52] U.S. Cl. ........................ 428/68; 428/76; 428/78; 428/189; 428/194; 428/318.4; 428/318.6; 428/319.1; 428/319.7; 156/79
[58] Field of Search .............. 428/68, 76, 77, 78, 428/79, 189, 190, 193, 194, 318.4, 318.6, 319.7, 319.1; 156/79

[56] References Cited

U.S. PATENT DOCUMENTS 4,378,395  3/1983  Asoshina et al. ........... 428/189
4,399,174  8/1983  Tanaka et al. ............. 428/189

FOREIGN PATENT DOCUMENTS 58-63542  4/1983  Japan .

Primary Examiner—William J. Van Balen
Attorney, Agent, or Firm—Armstrong, Nikaido Marmelstein Kubovcik & Murray

[57] ABSTRACT

A laminated material as a damping member welded to a panel of a vehicle body comprises a lower sheet of a foamable mer-sheet, an upper sheet of a non-foamable mer-sheet and an intermediate sheet of a reduced size to be interposed between the upper and lower sheets, wherein the upper and lower sheets are welded together at their peripheral end portions which come into direct contact with each other in laminated state. This structure probilits any irregularities present on the body panel surface from appearing on the upper surface of the laminated material and provides a good damping effect. A method for welding a laminated damping material to a vehicle body panel uses an oven which is used in a coating step of a vehicle body assembly line, dry heat of the oven permitting the layer of a foamable material to get foamed and fluidized when the damping material is passed through the oven the coating step, thus providing a thermal welding between the damping material and the panel. This method simplifies the assembling operation.

4 Claims, 1 Drawing Sheet

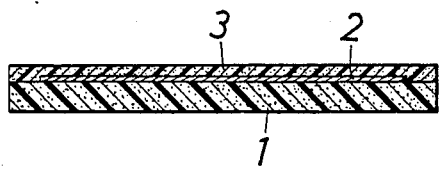
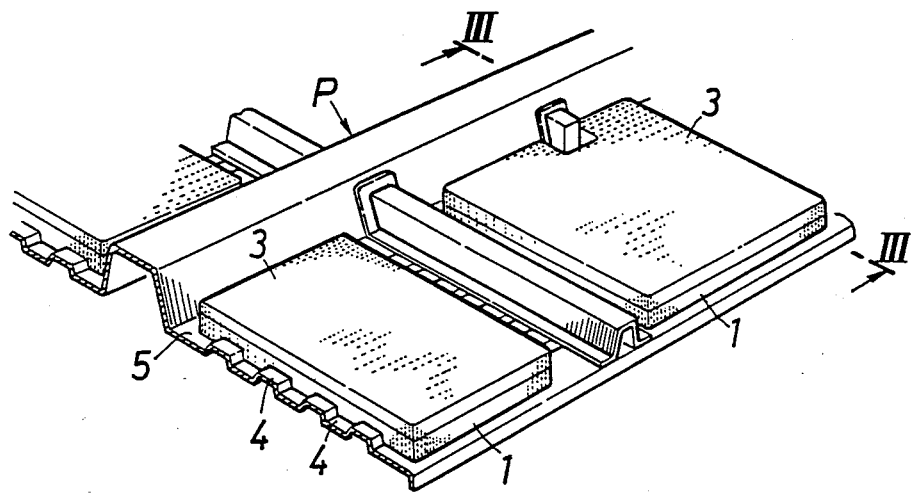
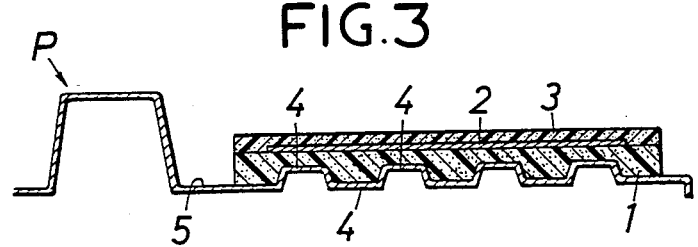

LAMINATED DAMPING MATERIAL FOR VEHICLE AND METHOD FOR WELDING THE MATERIAL TO VEHICLE BODY PANEL

BACKGROUND OF THE INVENTION

1. FIELD OF THE INVENTION

The present invention relates to laminated damping materials for vehicles and particularly to those which are in use welded onto vehicle body panels such as floor panels, and further to a method for welding such materials to the panels.

2. DESCRIPTION OF THE PRIOR ART

A vehicle such as an automobile is generally constructed to have a floor panel as part of its body bonded with a damping material thereon in order to improve vibration proofing, thermal insulation and sound insulation properties of the panel.

There are conventionally known as such a damping material one which is formed of a single mer-sheet including asphalt as a primary constituent and is thermally welded onto a floor panel, or one comprising, as shown in Japanese Patent Application Laid-open No. 63542/83, a sub panel which is fixed by clips to a floor panel through a mer-sheet interposed therebetween, the mer-sheet serving to provide a thermal welding between the floor and sub panels.

A floor panel in an automobile body structure, however, is generally constructed by using a steel plate having a thickness less than 1mm so that to compensate for the rigidity of such thin steel plate its surface is bent or beads are provided thereon so as to have an irregular or rugged cross-sectional shape.

In case of the afore-mentioned conventional damping material having a mer-sheet merely welded onto the floor panel, irregularities of the floor panel appear on the upper surface of the damping material and even when a mat is laid on the material, passengers in a vehicle compartment may still feel the irregularities of floor surface, thus deteriorating an impression given to the passengers.

When a mer-sheet and a sub panel are superposed together and are thermally welded as a damping material onto a vehicle floor panel as shown in Japanese publication No. 63542/83, it is required to bend the sub panel itself so as to conform to the configuration of the mating floor panel surface in order to obtain an intimate contact between the damping material and the rugged floor surface. This makes laminated damping materials expensive in the market and also makes it troublesome to fit the ruggedness on a sub panel to the ruggedness on a floor panel surface in assembly line.

SUMMARY OF THE INVENTION

The present invention has been proposed in view of the above circumstances and its object is to provide a laminated damping material for a vehicle which does not allow any irregularities, which may be formed by beads or the like on a vehicle body panel such as floor panel, to be felt by passengers and moreover which is excellent in vibration proofing, sound insulating and thermal insulating abilities.

Another object of the invention is to provide a method for welding a laminated damping material to a vehicle body panel, which serves to avoid the vehicle body assembling process from becoming complicated.

In order to achieve the above object, the invention provides a damping material which comprises a lower layer sheet formed of a foamable mer-sheet to be welded onto a vehicle body panel, an intermediate layer sheet laminated on the lower sheet, and an upper layer sheet formed of a non-foamable mer-sheet and laminated on the intermediate sheet, wherein the lower and upper sheets are formed to be larger in size than the intermediate sheet and those lower and upper sheets have peripheral end portions thereof superposed with each other in a directly contacting fashion, the peripheral end portions being welded together.

A laminated damping material constructed in the mentioned manner is advantageous in the following:

(1) The damping material has a unitarized three-layer lamination structure including upper and lower sheets which function as damping members and therefore can have a high vibration proofing property as well as high thermal- and sound-insulating properties.

(2) Even if ruggedness is present on the vehicle body panel surface such a by provision of beads, the lower sheet can be brought into tight contact with such rugged parts while keeping the upper surface of the laminated damping material flat. Any ruggedness does not appear on that upper surface and moreover the material can be strongly bonded to the vehicle body panel surface.

(3) No fixing means such as clips are needed to unitarize the laminated damping material with the panel surface.

(4) The peripheral ends of the laminated material are not peeled off nor separated from each other.

A method according to the invention utilizes a coating step and dry heat of an oven used in such coating step serves to weld a foamable layer of a laminated damping material to a vehicle body panel. This simplifies the assembling process as a whole.

BRIEF DESCRIPTION OF THE DRAWINGS

The accompanying drawings show one embodiment of a laminated damping material according to the invention, wherein FIG. 1 is a sectional view of the material before subjected to thermal welding operation, FIG. 2 is a perspective view of the material in a state welded to the surface of a vehicle body floor panel and FIG. 3 is a sectional view taken along the line III—III of FIG. 2.

DESCRIPTION OF PREFERRED EMBODIMENT

One embodiment of the invention will be described hereinafter with reference to the accompanying drawings.

In this embodiment, a laminated damping material according to the invention is formed into a square shape to be secured by welding onto a floor surface 5 of a floor panel P of an automobile body structure, as shown in FIGS. 1 and 2. The square material has a three-layer structure comprising a lower layer sheet 1, an intermediate layer sheet 2 laminated on the lower sheet 1 and an upper layer sheet 3 laminated on the intermediate sheet 2.

Detailed structures of these sheets 1, 2 and 3 will next be explained.

The lower layer sheet 1 is formed by a foamable mersheet serving as a foamed damping material. The lower layer sheet 1 therefore gets foamed and fluidized upon heating, which is in that state brought into tight contact with irregularities 4 provided such as by beads on the floor surface 5 of floor panel P while filling any spaces therebetween and is thermally welded onto the floor surface 5 as will be described later. The foamable mer-sheet to be used as the lower sheet 1 is of a conventionally known type including asphalt as a primary constituent.

The intermediate layer sheet 2 is formed of a thin steel plate having a thickness of 0.07–0.15 mm and thus has a sufficient flexibility. This sheet serves as a constraint plate of the laminated damping material and is easy to follow any irregular shape of the floor surface 5 of floor panel P which is formed bent.

The upper layer sheet 3 is formed by a non-foamable mer-sheet serving as a non-foamed damping material in a resultant product. This sheet is also of a known type with asphalt included therein as a primary constituent.

The intermediate layer sheet 1 is formed to have a size slightly smaller than those of the lower and upper sheets 1 and 3.

On the lower sheet 1 of a foamable mer-sheet is laminated the intermediate sheet 2 of a flexible thin steel plate and further on the intermediate sheet 2 is laminated the upper sheet 3 formed of a non-foamable mer-sheet. The lower sheet 1 and the intermediate sheet 2, and also the intermediate sheet 2 and the upper sheet 3, are partly bonded to each other or welded together by preheat to constitute the three-layer laminated damping material shown in FIG. 1.

Description will next be made as to an examplified process of thermally welding the afore-mentioned laminated damping material onto the floor surface 5 of vehicle body floor panel P.

In the midway of a step of coating the vehicle body, the laminated damping material is placed on the floor surface 5 of floor panel P.

The vehicle body is then passed through an oven in this coating step wherein dry heat of the oven acts on the lower sheet 1 of a foamable mer-sheet to cause the latter to be foamed and fluidized. The fluidized lower sheet 1 flows into and fills recess parts on the floor surface 5 of floor panel P and is thus thermally welded onto the floor surface 5. The upper sheet 3, intermediate sheet 2 and lower sheet 1 are also thermally welded to one another. At this moment, those peripheral parts of the upper and lower mer-sheets 3 and 2 which are superposed with each other in a directly contacting fashion are strongly bonded together by welding so as to enclose the intermediate sheet 2 therebetween. This welded structure prevents floating up of the intermediate sheet and separation and peeling off of end portions of the thus mounted laminated material. As a result, the upper surface of the upper sheet 3 can be kept flat so that passengers on the vehicle do not feel irregularities of the floor surface 5 of floor panel P on their feet.

Since the flexible intermediate sheet 2 can be well conformed to the bent floor surface 5, the laminated damping material has a high adaptability to the configuration of such floor surface 5.

In the described embodiment the laminated damping material according to the invention has been used on a floor panel of a vehicle body, however, it can be bonded to any other panel part of the vehicle body.

Moreover, though the intermediate layer sheet as a constraint plate has been formed of a flexible thin sheet plate in the above embodiment, when a mating vehicle body panel has no substantial bent portion, a thicker steel plate having a thickness of 0.4–0.8 mm or a synthetic resin plate can be used for forming the intermediate layer in order to give a high rigidity to the laminated material.

What is claimed is:

1. A laminated damping material for a vehicle comprising a lower layer sheet formed of a foamable mer-sheet to be welded onto a panel of a vehicle body, an intermediate layer sheet laminated on the lower layer sheet, and an upper layer sheet formed of a non-foamable mer-sheet and laminated on the intermediate layer sheet, wherein the lower and upper layer sheets are formed to be larger in size than the intermediate layer sheet and those lower and upper sheets have peripheral end portions thereof superposed with each other in a directly contacting fashion, said peripheral end portions being welded together.

2. A laminated damping material according to claim 1, wherein the intermediate layer sheet is formed of a flexible thin plate.

3. A laminated damping material according to claim 1, wherein the lower layer sheet gets foamed and fluidized upon heating and then is welded to the vehicle body panel.

4. A method for welding a laminated damping material to a vehicle body panel, wherein the laminated damping material has a layer formed of a material which upon heating gets foamed and fluidized, the method comprising the steps of placing the damping material on the panel, passing the damping material with the panel through an oven during a coating operation of a vehicle body, and welding the layer of the material to the panel with use of dry heat of the oven.

* * * * *

UNITED STATES PATENT AND TRADEMARK OFFICE
CERTIFICATE OF CORRECTION

| | |
|---|---|
| PATENT NO. : | 4,906,501 |
| DATED : | March 6, 1990 |
| INVENTOR(S) : | HONMA et al |

It is certified that error appears in the above-identified patent and that said Letters Patent is hereby corrected as shown below:

On the cover page, Item [75], after "Hitoshi Haga;", insert

--Kazuyuki Okui--.

Signed and Sealed this

Twenty-third Day of July, 1991

Attest:

Attesting Officer

HARRY F. MANBECK, JR.

Commissioner of Patents and Trademarks